United States Patent Office 3,161,630
Patented Dec. 15, 1964

3,161,630
AZONITRILES
Jean Auguste Phelisse and Claude Albert Quiby, Lyon, France, assignors to Societe des Usines Chimiques Rhone-Poulenc, Paris, France, a French body corporate
No Drawing. Filed Apr. 1, 1960, Ser. No. 19,192
Claims priority, application France Apr. 20, 1959
4 Claims. (Cl. 260—192)

This invention relates to azonitriles, to a process for their preparation, their use as polymerization catalysts, and to polymers derived from their use.

The azonitriles of the present invention have the formula:

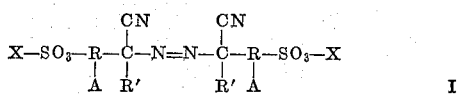

wherein R represents a trivalent saturated hydrocarbon radical containing not more than 4 carbon atoms, A represents a hydrogen atom or an alkoxycarbonyl radical, R' represents an alkyl radical containing 1 to 4 carbon atoms, and X represents an atom of hydrogen or an alkali metal. As representatives of this class there may particularly be mentioned azo-bis(sodium α-methylbutyronitrile-sulphonate), azo-bis(sodium isobutyronitrile-sulphonate), and azo-bis(sodium α-methyl-β-ethoxycarbonylbutyronitrile-sulphonate).

According to a feature of the invention, the azonitriles of Formula I are prepared by reacting a ketone of the formula:

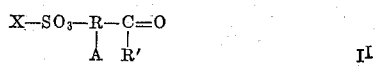

where R, A, R' and X are as above defined, with hydrazine and hydrogen cyanide and oxidizing the hydrazo-compound thus produced. The reaction is carried out under the conditions that are normally used for this type of reaction, which is known per se but has not heretofore been used to prepare compounds of Formula I.

The azonitriles of the invention are excellent initiators for the polymerization of compounds containing ethylenic double bonds activated by adjacent electrophilic groups. The compounds of Formula I where X is sodium are water-soluble and can be used in aqueous solution to initiate the polymerization of monomers dissolved or emulsified in the aqueous medium.

The present invention, therefore, further provides a process for the polymerization of a compound, containing an ethylenic double bond activated by an adjacent electrophilic group, wherein the polymerization is initiated by free radicals resulting from the decomposition of a sulphonated azo-compound of Formula I. The free radicals are most conveniently generated by the thermal decomposition of the azonitriles. The more important of the monomers polymerizable with the azonitriles of the invention are those of the formula:

where Y is a cyano, amido, acyloxy, or alkoxycarbonyl group and Z is a hydrogen atom or an alkyl group containing 1 to 4 carbon atoms.

The polymers produced by this process contain sulphonic groups and the presence of these sulphonic groups in very small amounts, e.g. one sulphonic group for 300 to 1000 (or even more) monomer groups, gives to the polymers a remarkable affinity for basic dyes.

The following Examples I to III illustrate the preparation of the azonitriles of the invention.

EXAMPLE I

*Azo-Bis(Sodium α-Methylbutyronitrile-Sulphonate)*

Into a 500 cc. spherical flask are introduced 175 g. (1.35 mol) of hydrazine sulphate ($NH_2$—$NH_2.H_2SO_4$) in suspension in 843 cc. of water. There are added to this suspension 132 g. of 85% sodium cyanide (2.7 mol) dissolved in 308 cc. of water. As soon as the medium has become clear, 519 g. (2.7 mol) of sodium butan-3-one-sulphonate (prepared by the method of Raschig and Prahl, Ann. 448, 302 (1926)) are added in small portions. Slight heating occurs. The product is cooled so that the temperature of the medium does not exceed 30° C. The reaction mixture is allowed to stand overnight. A fine precipitate of needles is formed, and 517 g. of dry crystals are obtained. The crude product is redissolved in a minimum of water and a current of chlorine is passed therethrough for 6 hours, the temperature being maintained below 15° C.

Azo-bis(sodium α-methylbutyronitrile-sulphonate) is obtained in a yield of 80–85%, calculated on the sodium butanone-sulphonate.

*Analysis.*—Found percent: C=29.6; H=3.5; N=13.7; S=16; Na=12. Calculated for:

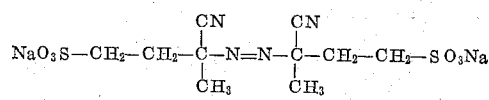

C=30.0; H=3.5; N=14.0; S=16.0; Na=11.5.

EXAMPLE II

*Azo-Bis(Sodium Isobutyronitrile-Sulphonate)*

One mol of chloracetone is run into a solution of one mol of sodium sulphite in 380 cc. of water with agitation. The temperature rises to 55° C. The product is left overnight and then evaporated to dryness. The residue is extracted with boiling alcohol. 117 g. of sodium 2-acetone-sulphonate are obtained. This salt is thereafter treated as in Example I with hydrazine sulphate and sodium cyanide, and is then oxidised with chlorine to azo-bis(sodium isobutyronitrile-sulphonate) of the formula:

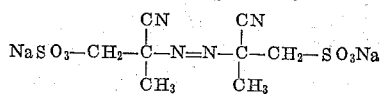

EXAMPLE III

*Azo-Bis(Sodium α-Methyl-β-Ethoxycarbonylbutyronitrile-Sulphonate)*

The procedure of Example I is followed, the sodium butan-3-one-sulphonate being replaced by sodium 2-ethoxycarbonyl-3-butanone-sulphonate:

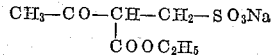

(prepared by the method of Raschig and Prahl, Ann. 448, 302 (1926)).

Azo - bis(sodium α-methyl-β-ethoxycarbonylbutyronitrile-sulphonate) is obtained of formula:

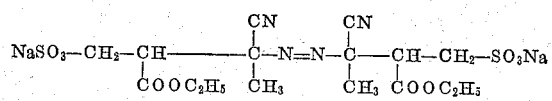

Examples IV to VI illustrate the use of the compounds of the invention as polymerization catalysts. The percentages given are by weight.

EXAMPLE IV

A reactor is charged with 25 g. of acryonitrile, 425 cc. of water saturated with carbon dioxide, and 1.25 g. (5%) of azo-bis(sodium α-methylbutyronitrile-sulphonate).

The mixture is heated under carbon dioxide at 78–80° C. for 2 hours. The product of the reaction is filtered, washed with distilled water and dried in an oven at 60° C. There is obtained, in a yield of 76%, a polyacrylonitrile which has a specific viscosity of 0.310, determined on 0.2% solution in dimethylformamide. The polyacrylonitrile contains 0.2% of sulphur, which corresponds to one α-methylbutyronitrile-sulphonic group to 300 acrylonitrile units.

By using 2% of catalyst instead of 5%, there is obtained, at 78–80° C., in the same yield, a polyacrylonitrile having a specific viscosity of 0.89.

If the water saturated with carbon dioxide is replaced by water containing sulphuric acid so as to obtain a pH of 3–4, a polyacrylonitrile having a specific viscosity of 1.73 is obtained at 80° C. in a yield of 92%.

By polymerizing at 55° C. instead of 80° C., with 5% of catalyst, at a pH of 3–4, a polyacrylonitrile having a specific viscosity of 4.60 is obtained in a yield of 84%.

Films are prepared from these various specimens of polyacrylonitrile and treated with a dye-bath in a proportion of 50 cc. of bath per gramme of film, the composition of the dye-bath being as follows:

14 mg. of solid green O, basic dye: Schultz-Farbstofftabellen No. 754, Colour Index No. 42,000,
0.15 g. of anhydrous sodium acetate,
1 cc. of glacial acetic acid,
1 cc. of a wetting agent, in one litre of water.

The bath is heated at 100° C. for 1 hour. The dyed samples are thereafter washed with cold water and dried.

While a comparison sample prepared by polymerization of acrylonitrile with unsulphonated azo-bis-isobutyronitrile has only a very faint pale green tint, the samples prepared with azo-bis(sodium α-methylbutyro-nitrile-sulphonate) have a dark green colour and the shade is deeper in proportion as the specific viscosity is lower, that is to say, as the number of sulphonated terminal groups per number of acrylonitrile units increases.

Proceeding in the same manner, but replacing the azo-bis(sodium α-methylbutyronitrile-sulphonate) by azo-bis (sodium isobutyronitrile-sulphonate) or by azo-bis(sodium α - methyl - β - ethoxycarbonylbutyronitrile - sulphonate), similar results are obtained.

EXAMPLE V

Acrylamide is polymerized in 10% solution in water with 5% (calculated on the monomer) of azo-bis(sodium α-methylbutyronitrile-sulphonate) at 50° C. for 3 hours. A complete conversion of the monomer is obtained, and 10.5 g. of polymer are obtained, which has a specific viscosity of 0.429 in a 0.1% solution in water.

EXAMPLE VI

Into a spherical flask provided with good agitation are introduced 50 g. of 10% aqueous polyvinyl alcohol solution (saponification number 135±10, viscosity in 5% aqueous solution at 20° C. 25±5 centipoises as measured on the Ostwald viscometer), and 50 g. of vinyl acetate. While heating under reflux, 10 cc. of a 4% aqueous solution of azo-bis(sodium α-methylbutyronitrile-sulphonate) are run in gradually over a period of 2 hours. In the second hour, a further 50 g. of monomer are gradually added. The reaction is thereafter continued for 2½ hours. The temperature at the end of the reaction is 76° C. A further 5 cc. of catalyst solution are added and the reaction is stopped half-an-hour later.

The polymerization takes place very regularly and there is finally obtained an emulsion, the dry content of which is 55.7%, and which contains less than 2.9% of unconverted monomer.

We claim:

1. Sulphonated azo-compounds of the formula:

$$X-SO_3-R-\underset{R'}{\underset{|}{C}}-N=N-\underset{R'}{\underset{|}{C}}-R-SO_3-X$$
$$\phantom{X-SO_3-R-}\overset{CN}{\phantom{C}}\phantom{-N=N-}\overset{CN}{\phantom{C}}$$

wherein R is a radical selected from the class consisting of —$CH_2CH_2$—, —$CH_2$—, and —$CH(COOC_2H_5)$—, R' is an alkyl radical of 1 to 4 carbon atoms, and X is a member of the class consisting of hydrogen and alkali metal atoms.

2. Azo-bis(sodium α-methylbutyronitrile-sulphonate).
3. Azo-bis(sodium isobutyronitrile-sulphonate).
4. Azo-bis(sodium α-methyl-β-ethoxycarbonylbutyronitrile sulphonate).

References Cited in the file of this patent

UNITED STATES PATENTS

| | | |
|---|---|---|
| 2,098,643 | Fischer et al. | Nov. 9, 1937 |
| 2,515,628 | Castle | July 18, 1950 |
| 2,520,338 | Robertson | Aug. 29, 1950 |
| 2,676,953 | Ham | Apr. 27, 1954 |
| 2,721,864 | Grandjean | Oct. 25, 1955 |
| 2,744,105 | Barney | May 1, 1956 |
| 3,020,265 | Tietz | Feb. 6, 1962 |